(12) United States Patent
Baxter et al.

(10) Patent No.: US 6,356,992 B1
(45) Date of Patent: Mar. 12, 2002

(54) METHOD AND APPARATUS FOR INTERLEAVED EXCHANGE IN A NETWORK MESH

(75) Inventors: Brent Baxter; Stuart Hawkinson; Satyanarayan Gupta, all of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/624,287

(22) Filed: Jul. 24, 2000

Related U.S. Application Data

(62) Division of application No. 08/773,262, filed on Dec. 23, 1996, now Pat. No. 6,173,387, which is a continuation of application No. 08/571,694, filed on Dec. 12, 1995, now abandoned, which is a continuation of application No. 08/241,182, filed on May 11, 1994, now abandoned.

(51) Int. Cl.⁷ .............................................. G06F 15/00
(52) U.S. Cl. ......................................... 712/11; 370/406
(58) Field of Search ...................... 712/10–19; 370/255, 370/257–258, 406; 709/221, 234, 239, 251–252

(56) References Cited

U.S. PATENT DOCUMENTS

| | | | |
|---|---|---|---|
| 4,709,327 A | 11/1987 | Hills et al. ..................... 712/14 |
| 5,038,386 A | 8/1991 | Li ............................... 382/302 |
| 5,103,343 A | 4/1992 | Harris et al. ................. 359/684 |
| 5,170,393 A | 12/1992 | Peterson et al. ............. 370/255 |
| 5,333,279 A | 7/1994 | Dunning ..................... 710/100 |

OTHER PUBLICATIONS

Shahid H. Bokhari & Harry Berryman; Complete Exchange on a Circuit Switched Mesh; 0–8186–2775–1/92 1992 IEEE; pp. 300–306.

William Stallings; Computer Organization and Architecture, Designing for Performance, Fourth Edition; 1996; pp. 597–603; Prentice Hall, Upper Saddle River, NJ.

Richard Dorf; The Electrical Engineering Handbook, Chapter 89, Parallel Processors; 1993; pp. 2052–2060; CRC Press, Boca Raton, FL.

(List continued on next page.)

Primary Examiner—Matthew Kim
Assistant Examiner—Denise Tran
(74) Attorney, Agent, or Firm—Blakely, Sokoloff, Taylor & Zafman LLP

(57) ABSTRACT

A method for exchanging information within a mesh network that has an array of nodes defined by four quadrants. The method includes the initial step of exchanging information from a set of nodes in one quadrant to a set of nodes located in an adjacent quadrant. The exchange of information simultaneously occurs in both a vertical and horizontal direction within the array. Information is then exchanged between nodes within the same quadrant and subquadrants.

23 Claims, 5 Drawing Sheets

OTHER PUBLICATIONS

John P. Hayes; Computer Architecture and Organization; 1978; pp. 230–236 & 405–409;McGraw–Hill Book Company.

Jean–Loup Baer; Computer Systems Architecture; 1980; pp. 527–555; Computer Science Press, Inc., Rockville, MD.

Dan I. Moldovan; Parallel Processing, From Applications to Systems; 1993; pp. 191–227, 235–239, 287–296, 330–344 & 376–384; Morgan Kaufman Publishers, San Mateo, CA.

M. Barnett, R. Littlefield, D.G. Payne. R. Van De Geijn; Efficient Communication Primitives on Mesh Architectures with Hardware Routing; 6th SIAM Conference on Parallel Processing for Scientific Computing; Mar. /22–24,1993; pp. 943–948.

W.J. Dally; A VLSI Architecture for Concurrent Data Structures; Kluwer Academic Publishers; 1987, pp. 1–242.

S.L. Johnsson & C–H. Ho; Optimum Broadcasting and Personalized Communication in Hypercubes; IEEE Trans. on Comp., C–38(9); Sep. 1989; pp. 1249–1268.

William Dally and Charles Seitz; Deadlock–Free Message Routing in Multiprocessor Interconnection Networks; IEEE vol. C–36, No. 5, May 1987; pp. 547–553.

M. Barnett, R. Littlefield, D.G. Payne. R. Van De Geijn; Global Combine on Mesh Architectures with Wormhole Routing; Proceedings of the 7th International Parallel Processing Symposium held Apr. 13–16, 1993 IEEE; pp. 156–162.

S.H. Bokhari; Multiphase Complete Exchange on a Circuit Switched Hypercube; Intel. Conf. on Parallel Processing; 1991, pp. I525–I529.

David S. Scott; Efficient All–to–All communication Patterns in Hypercube and Mesh Topologies; The $6^{th}$ Distributed Memory Computing Conference Proceedings, Apr. 28–May 1, 1991; 0–8186–2290–3/91.0000/0398 IEEE; pp. 398–403.

Shahid H. Bakhari, Complete Exchange on the iPSC–860, Nasa CR–187498, ICASE Report No. 91–4, 1/91, 32 pages.

Lai, et al., Placement of the Processors of a Hypercube, Jun. 1991, pp. 714–722.

METHOD AND APPARATUS FOR INTERLEAVED EXCHANGE IN A NETWORK MESH

CROSS REFERENCE TO RELATED APPLICATIONS

This application is a divisional and claims the benefit of application Ser. No. 08/773,262, entitled "Interleaved Exchange In A Network Mesh", by Brent Baxter, Stuart Hawkinson and Satyanarayan Gupta, filed Dec. 23, 1996, now U.S. Pat. No. 6,173,387, which is a continuation of application Ser. No. 08/571,694 now abandoned, entitled "Quadrant Exchange Algorithm", by Brent Baxter, Stuart Hawkinson and Satyanarayan Gupta filed Dec. 12, 1995, which is a continuation of application Ser. No. 08/241,182 now abandoned, entitled "Improvements to a Quadrant Exchange Algorithm", by Brent Baxter, Stuart Hawkinson and Satyanarayan Gupta, filed May 11, 1994.

BACKGROUND OF THE INVENTION

1. Field of the Invention

The present invention relates to a method of transmitting information within a network.

2. Description of Related Art

To increase the size, speed and scalability of computer systems, computers may be linked together within a network to process information in parallel. Such systems are commonly referred to as parallel processing networks. Parallel processing networks typically have a plurality of microprocessor based components coupled together by busses and associated hardware. Each processor based component functions as a node which can transmit information to other nodes within the network.

The nodes can be arranged as a plurality of interconnected cubes, commonly referred to as a hypercube. Hypercubes require a large number of data links, which increase the size of the system.

The nodes can also be arranged in a two-dimensional array, commonly referred to as a network mesh. FIGS. 1a–d show a method of exchanging information within a mesh that is commonly referred to as the Direct Exchange Algorithm. In the Direct Exchange method, information is exchanged from one node to another node within the same row of the mesh. The process is repeated until the information of one node is transferred to each of the nodes within the row. For example, as shown in FIG. 1a, in the first step, the information from node 1 is transferred to node 3, node 2 transfers information to node 1, node 3 transfers information to node 4 and the information of node 4 is transferred to node 2. The process of exchanging information between nodes is repeated in accordance with the patterns shown in FIGS. 1b, 1c and 1d. The information can then be exchanged between rows and the process is repeated. Although the Direct Exchange Algorithm has a relatively high transmission rate, the number of messages and the start-up time to send the messages from each node rapidly increases with the size of the mesh.

FIGS. 2a–f and 3a–d show other methods of exchanging information within a mesh, commonly referred to as the Binary Exchange Algorithm and the Quadrant Exchange Algorithm, respectively. Both of theses methods utilize a store and forward approach, wherein each node can both receive and forward information transmitted by another node. As shown in FIG. 2a, in the first step of the Binary Exchange method, the nodes in one half of the mesh transmit information to nodes in the other half of the mesh in a horizontal direction. The process is repeated by sending the information from one half of the mesh to the other half of the mesh in a vertical direction, as shown in FIG. 2b. As shown in FIGS. 2c–f, the information is then exchanged within quadrants and subquadrants of the mesh.

In the Quadrant Exchange method, information is exchanged within rectangular groups of nodes as shown in FIGS. 3a and 3b. As shown in FIG. 3C, the information is then exchanged within separate quadrants of the mesh. Although both the Binary and Quadrant Exchange methods can be used in large mesh networks, the start-up time and transmission rate are relatively slow. Additionally, the Quadrant method is susceptible to node contention. It would be desirable to provide an algorithm for a mesh network, that was not susceptible to node contention and had a relatively high complete information exchange rate.

SUMMARY OF THE INVENTION

The present invention is a method for exchanging information within a mesh network that has an array of nodes defined by four quadrants. The method includes the initial steps of exchanging information from a set of nodes in one quadrant to a set of nodes located in an adjacent quadrant. The exchange of information simultaneously occurs in both a vertical and horizontal direction within the array. Information is then exchanged between nodes within the same quadrant and subquadrants.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

The present invention is a method for exchanging information within a mesh network that has an array of nodes defined by four quadrants. The method includes the initial steps of exchanging information from a set of nodes in one quadrant to a set of nodes located in an adjacent quadrant. The exchange of information simultaneously occurs in both a vertical and horizontal direction within the array. Information is then transferred between nodes within the same quadrant and subquadrants.

Figure 1A:
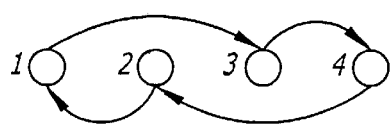
FIGS. 1a–d are schematics showing information being exchanged between nodes arranged in a row in accordance with a method in the prior art.
Figure 1B:
Figure 1C:
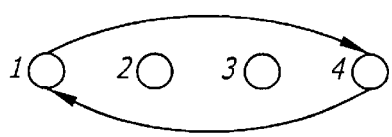
Figure 1D:
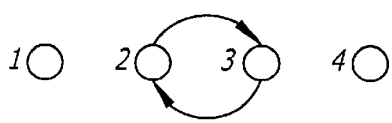
Figure 3A:
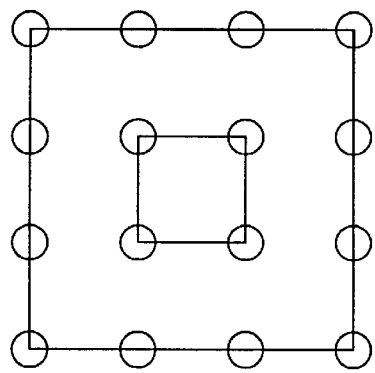
FIGS. 3a–c are schematics showing information being exchanged between nodes arranged in a two-dimensional array in accordance with a method in the prior art.
Figure 3B:
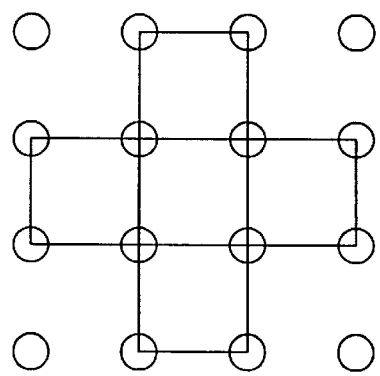
Figure 3C:
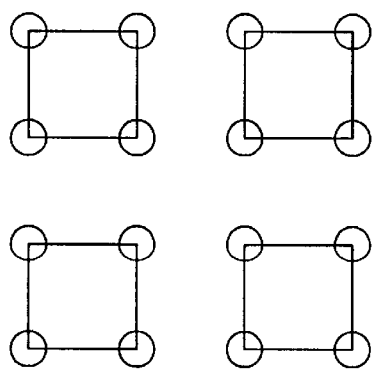
Figure 4:
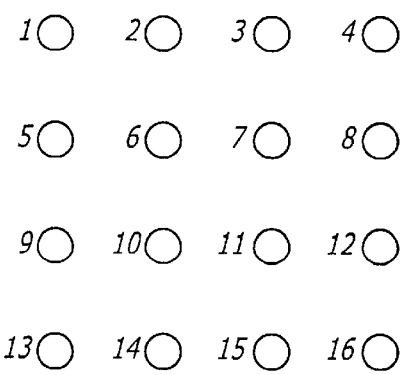
FIG. 4 is a schematic of a mesh network having an array of nodes that can transfer information.
Figure 2A:
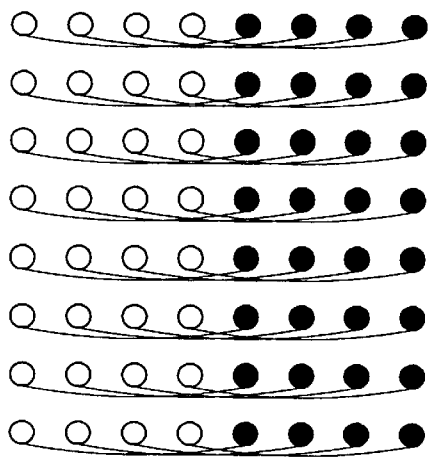
FIGS. 2a–f are schematics showing information being exchanged between nodes arranged in a two-dimensional array in accordance with a method in the prior art.
Figure 2B:
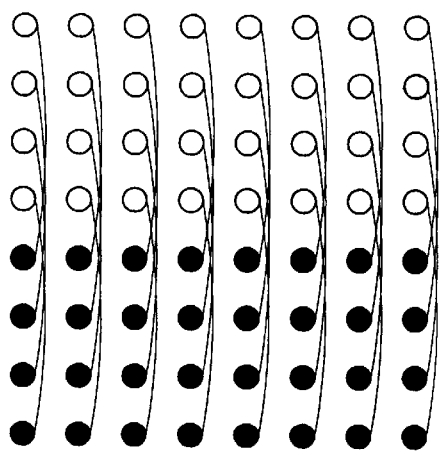
Figure 2C:
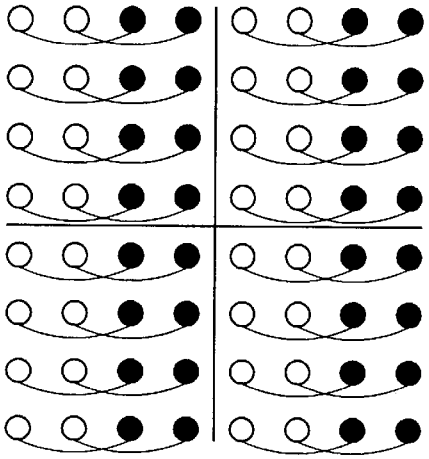
Figure 2D:
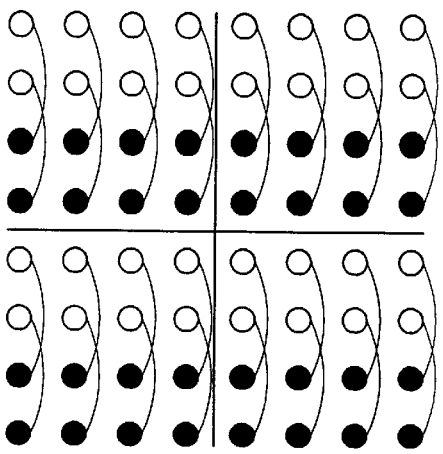
Figure 2E:
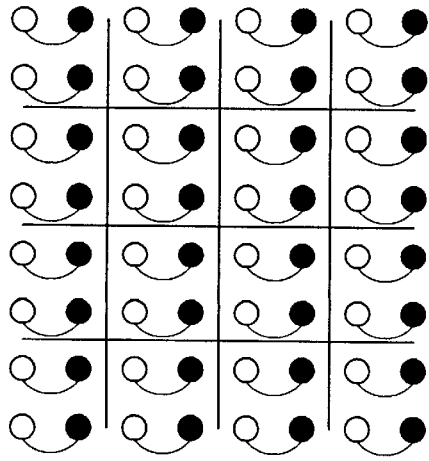
Figure 2F:
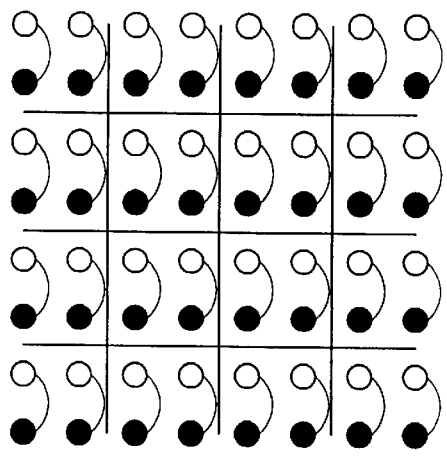
Figure 5:
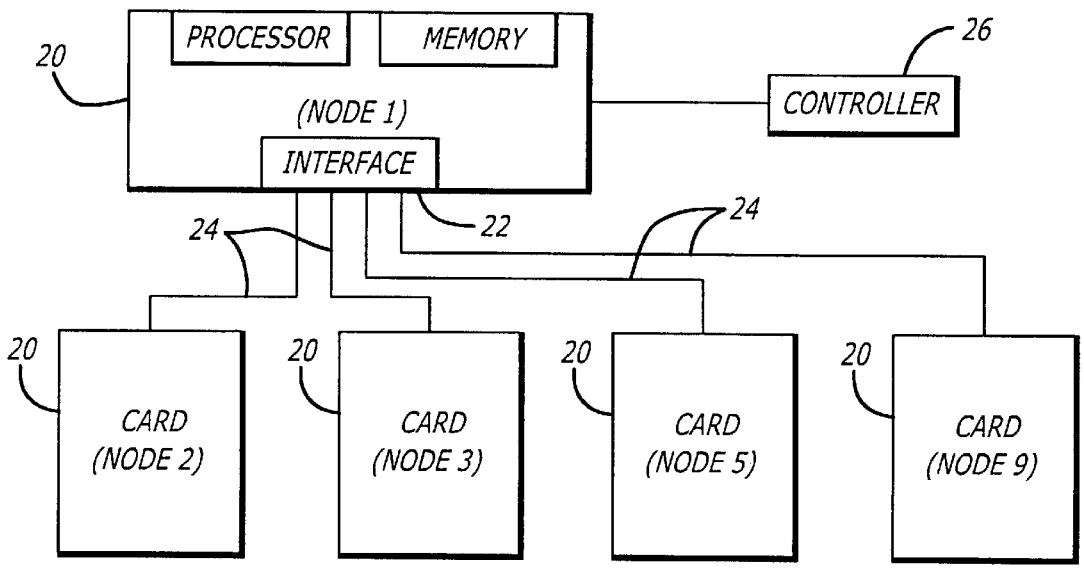
FIG. 5 is a schematic showing a node exchanging data with four neighboring nodes.

Referring to the drawings more particularly by reference numbers, FIG. 4 shows a mesh network which has a plurality of nodes labeled 1–16. Each node is capable of transmitting and receiving information from another node. As shown in FIG. 5, in the preferred embodiment, each node is a functional computer on a card 20 that can be plugged into the network. The card 20 contains a microprocessor, memory and other associated hardware required to process information. The computer cards 20 contain an interface 22 that couples the components of a card to a number of busses 24. The busses 24 interconnect the cards (nodes) and provide a medium to exchange information between the cards. The cards typically process information in parallel, wherein the mesh is a parallel processing network.

Each card generates an address for the destination node, along with the information that is to be transmitted to the other node. The address and information are then sent to a node in accordance with the algorithm of the present invention. The transmitting node may also receive information from the destination node. The receiving node stores both the address and the information sent by the transmitting node. If the receiving node has a matching address (destination node) then the node processes the information. If the address of the receiving card does not match the destination address, then the card forwards the address and information to the next node, again in accordance with the algorithm of the present invention. In the preferred embodiment, each node transfers information to a receiving node through a dedicated bus, to avoid bus contention within the system.

The network has a controller 26 which controls the exchange of information between the nodes. The controller 26 controls which node will receive the information. For example, in accordance with the algorithm of the present invention, the card 20 at node 1 may initially exchange information with node 3, then exchange information with node 9 and finally exchange information with nodes 2 and 5. In the first step, the controller 26 enables the interface of the cards at nodes 1 and 3 to exchange information. The controller 26 may initially allow information generated by node 1 to be transmitted to node 3, and the information generated by node 3 to be subsequently transmitted to node 1. The controller can control the bus and corresponding node that is to receive the information by providing a command to the card or driving active one or more control signals that enable each bus.

If the information sent by node 3 is to be processed by node 1, the card at node 1 processes the information. If the information transmitted by node 3 is not to be processed by node 1, node 1 retransmits the information generated by node 3 to node 9 in accordance with the second step of the algorithm. Node 1 also receives information from node 9, and the process is repeated with nodes 2 and 5.

FIGS. 6a–d show the steps of exchanging information in accordance with an algorithm of the present claimed invention. The method allows the nodes located along a diagonal line of the array to exchange information from one half of the mesh to another half of the mesh. The information is exchanged in both a horizontal and vertical direction within the array. The process of vertically and horizontally exchanging information from nodes along a diagonal line may be repeated a predetermined number of times. The information is then exchanged between nodes within the same quadrant and subquadrants of the nodal array.

Figure 6A:
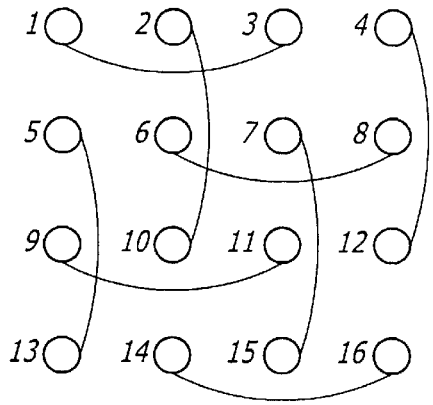
FIG. 6a is a schematic of a four by four array of nodes showing a first step of the present method.

FIGS. 6a–6d show the steps of exchanging information within a 4 by 4 array of nodes in accordance with an algorithm of the present invention. The lines indicate the path of information exchanged between the corresponding nodes. The first step is shown in FIG. 6a, wherein nodes 1, 6, 9 and 14 exchange information with nodes 3, 8, 11 and 16, respectively, in a horizontal direction of the array, and nodes 2, 4, 5 and 7 exchange information with nodes 10, 12, 13 and 15, in a vertical direction of the array. The exchange of information is interleaved between the nodes, so that none of the nodes both receive and transmit information with more than one node at a time. The interleaving pattern prevents node contention.

Figure 6B:
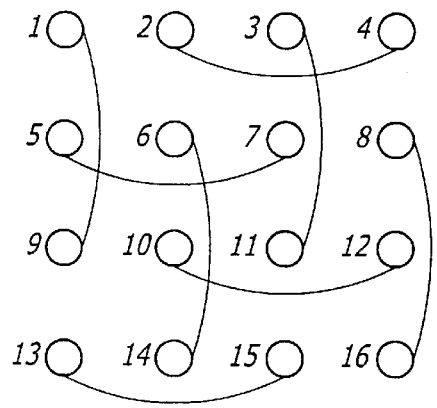
FIG. 6b is a schematic similar to FIG. 3a showing a second step of the method.

The second step of the algorithm is shown in FIG. 6b, wherein the nodes that exchanged information horizontally in the first step, exchange information vertically, and the nodes that exchanged information vertically exchange horizontally. Accordingly, in the second step, nodes 1, 3, 6 and 8 exchange information with nodes 9, 11, 14, and 16, respectively in the vertical direction, and nodes 2, 5, 10 and 13 exchange information with nodes 4, 7, 12 and 15, respectively in the horizontal direction.

Figure 6C:
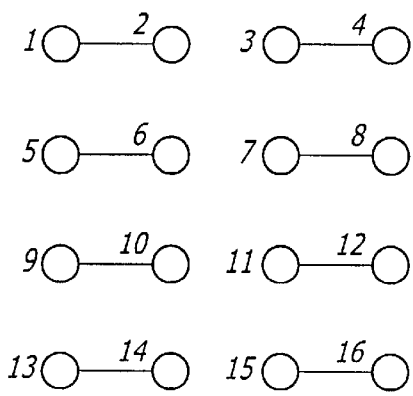
FIG. 6c is a schematic similar to FIG. 3a showing a third step of the method.
Figure 6D:
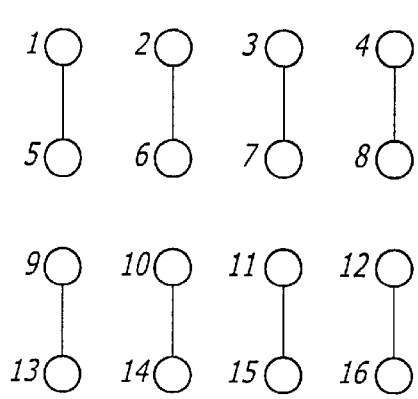
FIG. 6d is a schematic similar to FIG. 3a showing a fourth step of the method.

FIGS. 6c and 6d, show steps three and four of the present algorithm, respectively, wherein the nodes exchange information within the same quadrant of the mesh. In step three (FIG. 6c) the nodes all exchange information horizontally with an adjacent node in the same quadrant. In step four (FIG. 6d) the nodes all exchange information vertically with an adjacent node in the same quadrant. The steps shown in FIGS. 6a–d are then repeated.

Figure 7A:
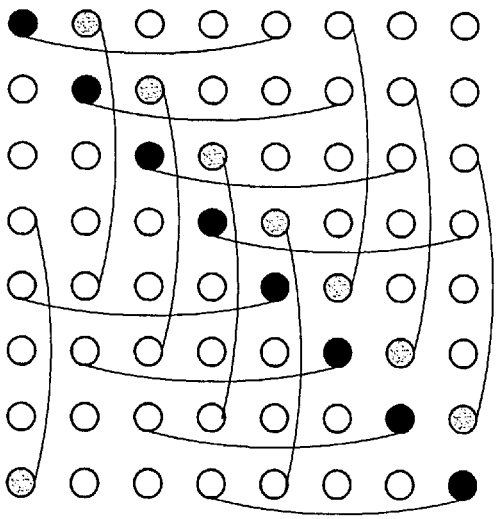
FIGS. 7a–h are schematics showing the method in an eight by eight array of nodes.
Figure 7B:
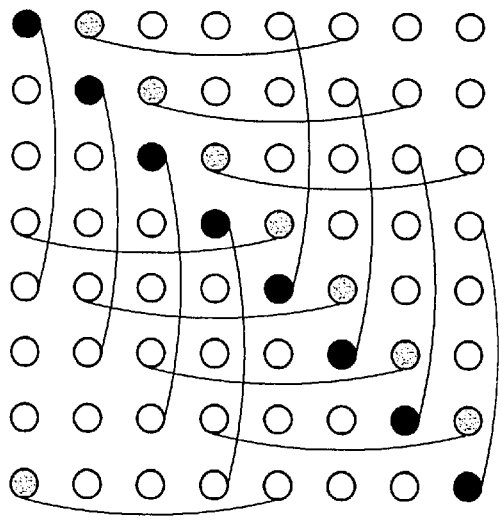
Figure 7C:
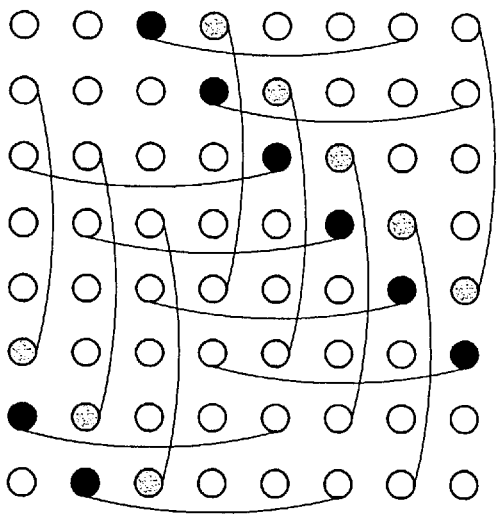
Figure 7D:
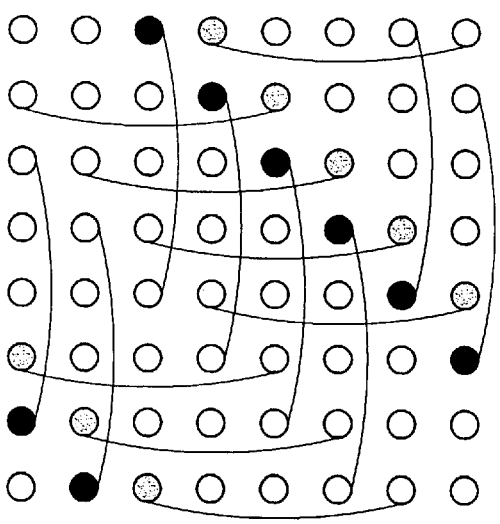

FIGS. 7a–h show the algorithm of the present invention being performed within an 8 by 8 array of nodes. Like the process of exchanging information in the 4 by 4 array, the nodes in one quadrant of the mesh exchange information to nodes in an adjacent quadrant of the array in both the vertical and horizontal directions. The process of exchanging information between quadrants of nodes is repeated three more times as shown in FIGS. 7b–d. The nodes then exchange information with nodes of the same quadrant and subquadrant as shown in FIG. 7e–h. Although 4 by 4 and 8 by 8 nodal arrays are shown and described, it is to be understood that the algorithm of the present claimed invention can be used in other two-dimensional nodal arrays.

The complete time to exchange information between nodes can be defined by the following three parameters.

Latency (α): the latency is defined as the start up time required to exchange a message and includes fixed overheads associated with each message. α typically has the units of seconds.

Bandwidth (B): the bandwidth is the rate at which information can be transmitted along the communication links between the nodes. B typically has the units of bytes/sec.

Rearrangement rate (δ): the rearrangement rate is the rate at which information can be rearranged at the node for further transmission. δ typically has the units of bytes/sec.

The complete exchange of information using the algorithm of the present invention is defined by the following equation.

$$2^k \alpha + 2^{(k-1)} \frac{mn}{B} + K \frac{mn}{\delta}$$

-continued wherein;

m = the bytes of data transferred.

n = the number of nodes in the network.

$K = \log_2 \sqrt{n}$ {or k such that $n = 2^k \cdot 2^k$}.

The first term of the equation relates to the latency of the system, the second term corresponds to the system bandwidth, and the last term defines the rearrangement rate. Table I shows the different terms of the equation for the method of the present invention (entitled Interleaved Binary Exchange) with similar terms for information exchange equations relating to the Direct Exchange algorithm, Binary Exchange algorithm and the Quadrant Exchange algorithm.

TABLE I

| | | Start-Up Time | Transmission Time | Re-arrangement Time |
|---|---|---|---|---|
| Binary Exchange | Absolute | $2(2^k - 1)\alpha$ | $(2^k - 1)\frac{nm}{\beta}$ | $k\frac{nm}{\delta}$ |
| | Relative | ~2 | ~2 | 1 |
| Direct Exchange | Absolute | $2^{(3k-2)}\alpha$ | $\frac{2^k}{4} \cdot \frac{nm}{\beta}$ | None |
| | Relative | $2^{2k}/4$ | ½ | 0 |
| Quadrant Exchange | Absolute | $3(2^k - 1)\alpha$ | $\frac{3}{4}(2^k - 1)\frac{nm}{\beta}$ | $k\frac{mn}{\delta}$ |
| | Relative | ~3 | ~3/2 | 1 |
| Interleaved Binary | Absolute | $2^k\alpha$ | $\frac{1}{2}(2^k)\frac{nm}{\beta}$ | $k\frac{mn}{\delta}$ |
| Exchange | Relative | 1 | 1 | 1 |

As shown in Table I, the algorithm of the present invention provides improved performance over both the Binary Exchange and Quadrant Exchange algorithms by reducing the start-up and transmission times. The Direct Exchange algorithm provides better performance for both the transmission time and the rearrangement time, but the start-up time and number of messages increases drastically for larger mesh networks. The present invention thus provides an algorithm that improves the performance of scalable parallel processing networks over algorithms in the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for transmitting information within a network that has nodes one through sixteen arranged in a four by four array wherein nodes one through four are in a first row, nodes five through eight are in a second row, nodes nine through twelve are in a third row and nodes thirteen through sixteen are in a fourth row, comprising the steps of:

a) exchanging information between node one and node three, between node nine and node eleven, between node six and node eight, between node fourteen and node sixteen, between node two and node ten, between node four and node twelve, between node five and node thirteen, between node seven and node fifteen;

b) exchanging information between node one and node nine, between node three and node eleven, between node six and node fourteen, between node eight and node sixteen, between node two and node four, between node five and node seven, between node ten and node twelve, between node thirteen and node fifteen;

c) exchanging information between node one and node two, between node three and node four, between node five and node six, between node seven and node eight, between node nine and node ten, between node eleven and node twelve, between node thirteen and node fourteen, between node fifteen and node sixteen; and, d) exchanging information between node one and node five, between node two and node six, between node three and node seven, between node four and node eight, between node nine and node thirteen, between node ten and node fourteen, between node eleven and node fifteen, between node twelve and node sixteen.

2. A method for performing interleaved exchange of data messages between nodes of a quadrant and nodes of a different quadrant in a two-dimensional network mesh of nodes, the two-dimensional network mesh having four quadrants of nodes, each of the quadrants being a $2^N$ by $2^N$ two dimensional matrix of nodes, each quadrant of nodes being exclusive to the corresponding quadrant, the method comprising the operations of:

(a) simultaneously exchanging data messages between each node located along a first diagonal of the two-dimensional network mesh and a corresponding node in an adjacent quadrant in a first orthogonal direction, the first diagonal being included in two of the four quadrants while exchanging data messages between each node located along a second diagonal of the two-dimensional network mesh and a corresponding node in an adjacent quadrant in a second orthogonal direction, the second orthogonal direction being orthogonal to the first orthogonal direction, the second diagonal being adjacent to the first diagonal and being included in two of the four quadrants; and (b) simultaneously exchanging data messages between each node located along the first diagonal of the two-dimensional network mesh and a corresponding node in an adjacent quadrant in the second orthogonal direction while exchanging data messages between each node located along the second diagonal of the two-dimensional network mesh and a corresponding node in an adjacent quadrant in the first orthogonal direction.

3. The method of claim 2 wherein each node of the two-dimensional network mesh communicates to no more than one other node of the two-dimensional network mesh at a time.

4. The method of claim 2 wherein each node of the mesh comprises a processor.

5. The method of claim 2 wherein the simultaneous exchange of data messages in the horizontal and vertical directions between the respective nodes is an interleaved exchange.

6. The method of claim 2 wherein each node of the two dimensional network mesh comprises a computer and the two dimensional network mesh of computers exchange data messages to perform parallel processing.

7. The method of claim 6 wherein the two-dimensional network mesh of processors exchange data messages to perform parallel processing.

8. A method of interleaved binary exchange of data in a two-dimensional network mesh of processor nodes, the two-dimensional network mesh of processor nodes arranged into four non-overlapping quadrants, the method of interleaved binary exchange of data comprising:

simultaneously exchanging data in horizontal and vertical directions between processor nodes in the two-dimensional network mesh of processor nodes as shown in FIG. 6a;

simultaneously exchanging data in vertical and horizontal directions between processor nodes in the two-dimensional network mesh of processor nodes as shown in FIG. 6b;

exchanging data in the horizontal direction only between adjacent processor nodes in each quadrant in the two-dimensional network mesh of processor nodes as shown in FIG. 6c; and exchanging data in the vertical direction only between adjacent processor nodes in each quadrant in the two-dimensional network mesh of processor nodes as shown in FIG. 6d.

9. The method of claim 8 wherein the two-dimensional network mesh of processors exchange data messages to perform parallel processing.

Figure 7E:
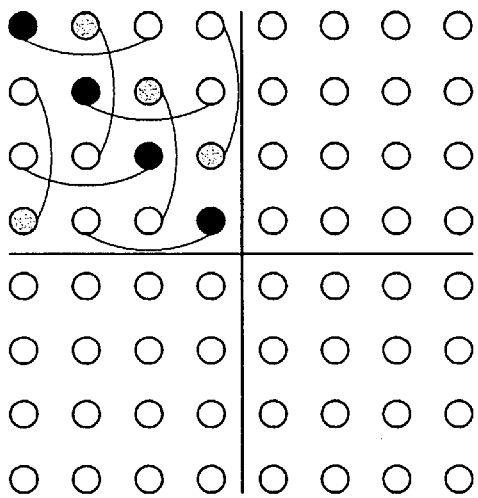
Figure 7F:
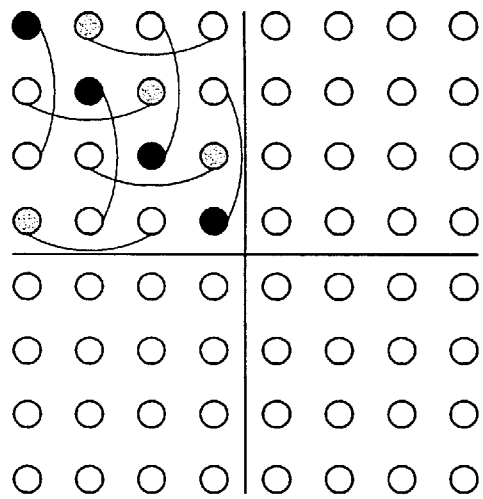
Figure 7G:
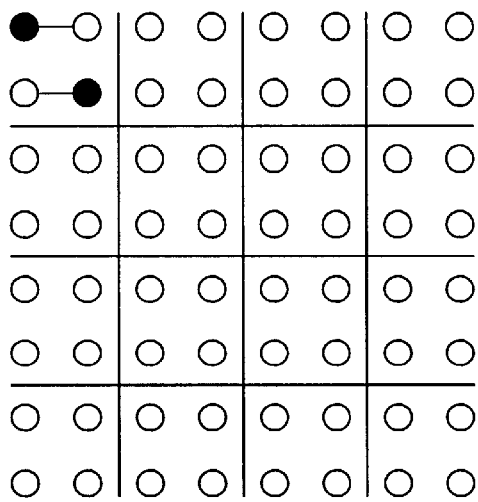
Figure 7H:
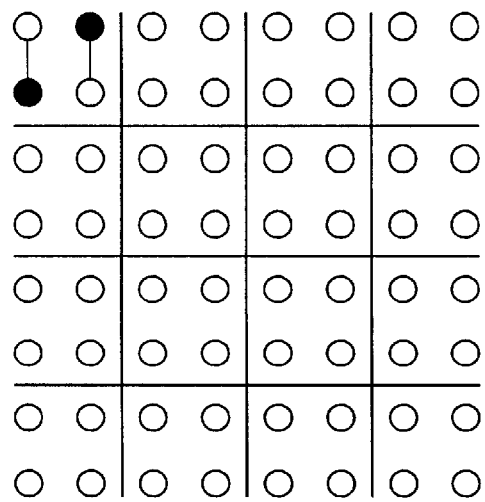

10. A method of interleaved binary exchange of data in a two-dimensional network mesh of processor nodes, the two-dimensional network mesh of processor nodes arranged into four non-overlapping quadrants, each quadrant arranged into four non-overlapping subquadrants, the method of interleaved binary exchange of data comprising:

simultaneously exchanging data in horizontal and vertical directions between processor nodes in each adjacent quadrant in the two dimensional network mesh of processor nodes as shown in FIG. 7a;

simultaneously exchanging data in vertical and horizontal directions between processor nodes in each adjacent quadrant in the two dimensional network mesh of processor nodes as shown in FIG. 7b;

simultaneously exchanging data in horizontal and vertical directions between processor nodes in each adjacent quadrant in the two dimensional network mesh of processor nodes as shown in FIG. 7c;

simultaneously exchanging data in vertical and horizontal directions between processor nodes in each adjacent quadrant in the two dimensional network mesh of processor nodes as shown in FIG. 7d;

simultaneously exchanging data in horizontal and vertical directions between processor nodes in each quadrant in the two dimensional network mesh of processor nodes as shown in FIG. 7e;

simultaneously exchanging data in vertical and horizontal directions between processor nodes in each quadrant in the two dimensional network mesh of processor nodes as shown in FIG. 7f;

exchanging data in the horizontal direction only between processor nodes in each subquadrant in the two dimensional network mesh of processor nodes as shown in FIG. 7g; and exchanging data in the vertical direction only between processor nodes in each subquadrant in the two dimensional network mesh of processor nodes as shown in FIG. 7h.

11. The method of claim 10 wherein the two dimensional network mesh of processors exchange data messages to perform parallel processing.

12. A method of interleaved binary exchange of data in a two-dimensional network mesh of processor nodes, the two-dimensional network mesh of processor nodes arranged into four non-overlapping quadrants, each quadrant arranged into four non-overlapping subquadrants, each of the quadrants being a $2^N$ by $2^N$ two dimensional matrix of processor nodes with each processor node having an address, the method of interleaved binary exchange of data comprising:

each processor node having data to be transferred in the two dimensional network mesh generating a destination address for a destination processor node;

simultaneously,
exchanging destination addresses and data in a horizontal direction between each processor node located along a first main diagonal of the two-dimensional network mesh and each corresponding processor node in an adjacent quadrant while exchanging destination addresses and data in a vertical direction between each processor node located along a second wrapped diagonal of the two-dimensional network mesh and each corresponding processor node in the adjacent quadrant, the second wrapped diagonal being adjacent and parallel to the first main diagonal;

storing first received destination addresses and data at each processor node into memory at each processor node;

if an address of the first received destination addresses matches the address of the processor node, processing the received data associated with the matched address at the processor node;

simultaneously,
exchanging destination addresses and data in the vertical direction between each processor node located along the first main diagonal of the two-dimensional network mesh and each corresponding processor node in the adjacent quadrant while exchanging destination addresses and data in the horizontal direction between each processor node located along the second wrapped diagonal of the two-dimensional network mesh and each corresponding processor node in the adjacent quadrant;

storing second received destination addresses and data into memory at each processor node; and if an address of the second received destination addresses matches the address of the processor node, processing the received data associated with the matched address at the processor node.

13. The method of claim 12 wherein the simultaneous exchange in the horizontal and vertical directions between the respective processor nodes is an interleaved exchange.

14. The method of claim 12 further comprising:

simultaneously,
exchanging destination addresses and data in a horizontal direction between each processor node located along a third wrapped diagonal of the two-dimensional network mesh and each corresponding processor node in an adjacent quadrant, the third wrapped diagonal being adjacent and parallel to the second wrapped diagonal, while exchanging destination addresses and data in a vertical direction between each processor node located along a fourth wrapped diagonal of the two-dimensional network mesh and each corresponding processor node in the adjacent quadrant, the fourth wrapped diagonal being adjacent and parallel to the third wrapped diagonal;

storing third received destination addresses and data at each processor node into memory at each processor node; and if an address of the third received destination addresses matches the address of the processor node, processing the received data associated with the matched address at the processor node.

15. The method of claim 14 further comprising:

simultaneously, exchanging destination addresses and data in a vertical direction between each processor node located along the third wrapped diagonal of the two-dimensional network mesh and each corresponding processor node in an adjacent quadrant, while exchanging destination addresses and data in a horizontal direction between each processor node located along the fourth wrapped diagonal of the two-dimensional network mesh and each corresponding processor node in the adjacent quadrant;

storing fourth received destination addresses and data at each processor node into memory at each processor node; and if an address of the fourth received destination addresses matches the address of the processor node, processing the received data associated with the matched address at the processor node.

16. The method of claim 15 further comprising:

in each quadrant simultaneously, exchanging destination addresses and data in a horizontal direction between each processor node located along a main diagonal of each quadrant and each processor node located after skipping each adjacent processor node to each processor node located along the main diagonal of each quadrant, while exchanging destination addresses and data in a vertical direction between each processor node located along a first wrapped diagonal of each quadrant and each processor node located after skipping each adjacent processor node to each processor node located along the first wrapped diagonal of each quadrant;

storing fifth received destination addresses and data at each processor node into memory at each processor node; and if an address of the fifth received destination addresses matches the address of the processor node, processing the received data associated with the matched address at the processor node.

17. The method of claim 16 further comprising:

in each quadrant simultaneously, exchanging destination addresses and data in a vertical direction between each processor node located along the main diagonal of each quadrant and each processor node located after skipping each adjacent processor node to each processor node located along the main diagonal of each quadrant, while exchanging destination addresses and data in a horizontal direction between each processor node located along the first wrapped diagonal of each quadrant and each processor node located after skipping each adjacent processor node to each processor node located along the first wrapped diagonal of each quadrant;

storing sixth received destination addresses and data at each processor node into memory at each processor node; and if an address of the sixth received destination addresses matches the address of the processor node, processing the received data associated with the matched address at the process or node.

18. The method of claim 17 further comprising:

in each subquadrant, exchanging destination addresses and data in a horizontal direction between each adjacent processor node;

storing seventh received destination addresses and data at each processor node into memory at each processor node; and if an address of the seventh received destination addresses matches the address of the processor node, processing the received data associated with the matched address at the processor node.

19. The method of claim 18 further comprising:

in each subquadrant, exchanging destination addresses and data in a vertical direction between each adjacent processor node;

storing eighth received destination addresses and data at each processor node into memory at each processor node; and if an address of the eighth received destination addresses matches the address of the processor node, processing the received data associated with the matched address at the processor node.

20. The method of claim 12 wherein each of the processor nodes of the two-dimensional network of processor nodes includes a microprocessor, memory and a bus interface to process data.

21. The method of claim 20 wherein each of the microprocessors process data in parallel and the two-dimensional network of processor nodes is a parallel processing network.

22. The method of claim 12 wherein each of the processor nodes in the two-dimensional network of processor nodes is a computer to process data.

23. The method of claim 22 wherein each of the computers process data in parallel and the two-dimensional network of processor nodes is a parallel processing network.

* * * * *